3,400,610
LOCKING DIFFERENTIAL GEAR
Paul E. Taylor, deceased, late of Livonia, Mich., by Katherine M. Taylor, administratrix, Livonia, Mich., and Charles C. Bookout, Livonia, Mich., assignors to Ford Motor Company, Dearborn, Mich., a corporation of Delaware
Filed Mar. 31, 1966, Ser. No. 539,223
9 Claims. (Cl. 74—710.5)

ABSTRACT OF THE DISCLOSURE

An electric motor compresses a clutch pack located between one side gear and a clutch housing fastened to the ring gear to prevent differential action at torques less than those capable of inducing clutch slippage. The electric motor is controlled by a control circuit preventing compression at vehicle speeds above a predetermined value, permitting compression according to a manual signal at speeds below the predetermined value, and automatically removing compression when vehicle speed increases through the predetermined value.

---

This invention provides a differential gear assembly capable of being locked to prevent differentiation according to an operator's desires. The assembly is useful in vehicles operating primarily off the road such as tractors and earth moving equipment as well as vehicles operating primarily on the road such as autos, trucks and buses.

Differential gears are included in vehicle final drive assemblies to permit a difference in the speed of the driving wheels. Benefits resulting therefrom include increased driver control over the vehicle, reduced stresses on driveline parts, and reduced tire wear. When both driving wheels are equally loaded and are on surfaces having equal friction characteristics, the differential gear divides engine torque equally between the wheels. However, differences in loading or frictional characteristics occur frequently during normal vehicle operation such as when turning the vehicle or operating with the driving wheels on surfaces having unequal friction characteristics. When a difference in loading or frictional characteristics exists, the gear supplies the most torque to the wheel capable of dissipating it, which is the wheel most capable of spinning and thereby least capable of providing driving force for the vehicle. This characteristic of differential gears is undesirable particularly at low vehicle speeds where maximum driving force from each wheel is needed. At higher vehicle speeds equalized driving force is less critical and differential action more deisrable to relieve the increased driveline stresses and tire wear.

Prior to this invention many vehicles have been equipped with differential gears that lock automatically when vehicle speed or torque differentiation exceeds a certain minimum and remain locked for all higher values. This type of gear permitted differentiation for cornering, which usually occurs at low speeds, while providing locking action at higher speeds and torque differentiations. Other vehicles included a clutch mechanism locking the differential gear below certain values of torque differentiation and slipping above that value. Since locking is desired only when loads or friction characteristics are different, which is a small percentage of total vehicle operating time, these gears unnecessarily increased driveline stresses and tire wear throughout most vehicle operations.

Manually actuated hydraulic systems are provided by the prior art to lock the differential gear when desired by the driver, but these systems require expensive hydraulic tubing and sealed hydraulic structures. Electric solenoid systems are also available. However, the sudden actuation inherent with hydraulic and electric solenoid systems increases driveline stresses beyond those encountered with permanently locked differential gears.

The differential gear assembly of this invention is manually actuatable by the driver when desired for conditions requiring locking action, is relatively inexpensive, and provides a smooth locking action that does not increase substantially driveline stresses. This gear assembly comprises a driving member and a pair of driven members, a clutch adapted to engage two of said members, and an electric motor for actuating the clutch. In most constructions of the gear assembly of this invention a differential cage is rotatably mounted in a housing with a pair of pinion gears pivotally mounted in the cage for rotation therewith. The driving member operably engages the differential cage and the driven members comprise side gears meshing with the pinion gears. The clutch is adapted to engage the cage and one of the driven members, thereby locking the differential gear. Smooth locking and unlocking action is provided by the clutch and electric motor, which also permit adjustment of the maximum vehicle speed at which locking action can occur and of the maximum torque that can be locked through the gear.

In refined versions of the gear assembly of this invention, the electric motor has a control circuit comprising switches for manually initiating motor operation. The control circuit can include speed sensitive switches automatically operating the motor to disengage the clutch when vehicle speed exceeds a preselected value. A single relay in the control circuit activates switches initiating motor operation to lock the differential gear.

Other advantageous features of the gear assembly of this invention will appear from the following detailed description of the structure shown in the drawings in which.

Figure 1:
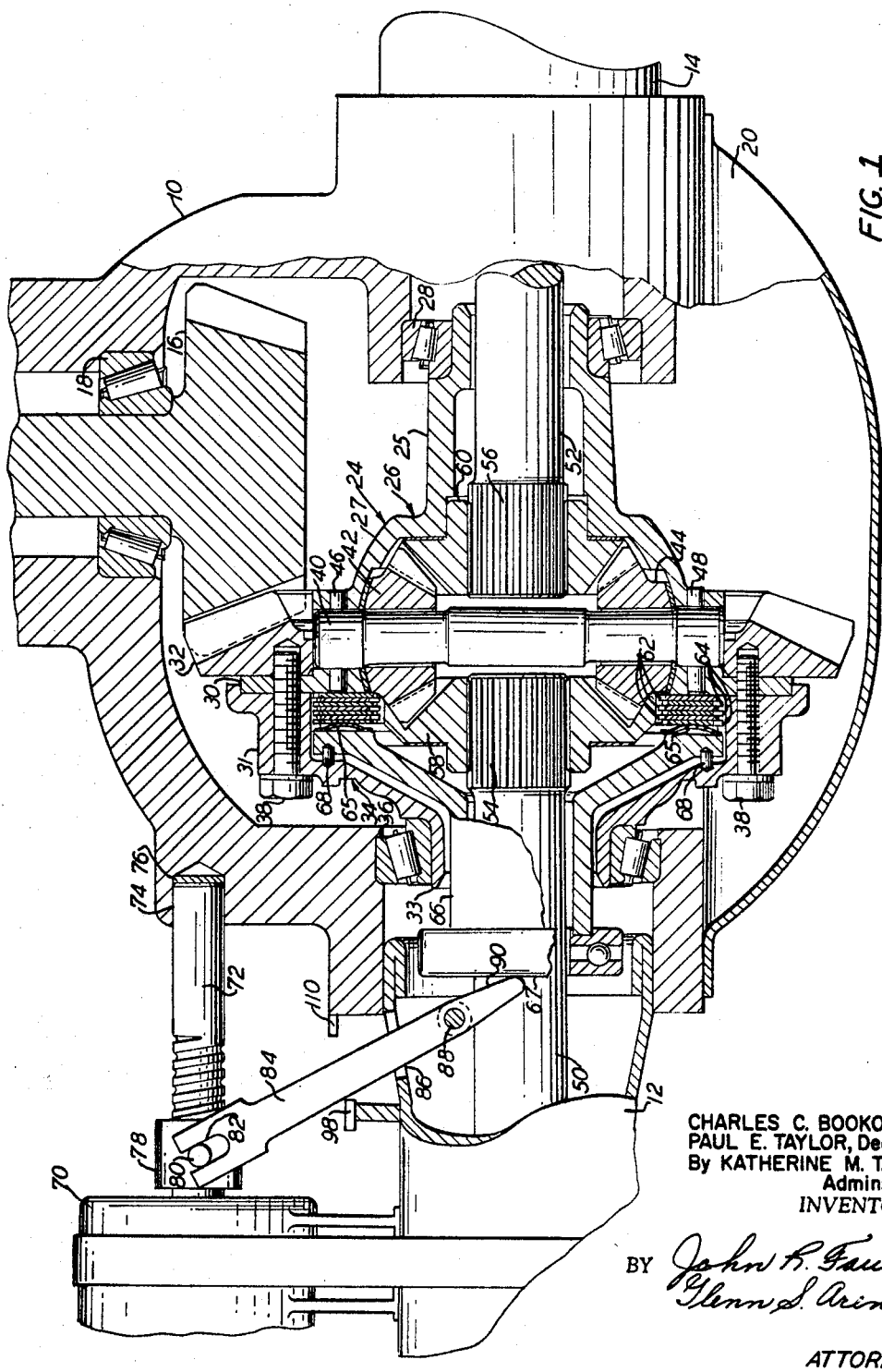
FIGURE 1 is a sectional top view of the differential housing and electric motor assembly of this invention.

Referring to FIGURE 1, a carrier housing 10 has left and right axle shaft housings 12 and 14 projecting coaxially from opposite sides. A drive pinion 16 is rotatably mounted by roller bearing assembly 18 in housing 10 at right angles to housings 12 and 14. Opposite pinion 16 is a cover 20 attached to housing 10 to close the interior of housing 10.

A differential cage indicated generally by the numeral 24 is mounted in the interior of housing 10. Cage 24 includes a pinion gear carrier 26, ring gear 32 and clutch housing 34. Carrier 26 is bell shaped and is mounted for rotation within the interior of housing 10 by roller bearing assembly 28 located at its small end 25 adjacent housing 14. The other end of carrier 26 opens into an enlarged portion 27 that terminates in a radial flange 30. Ring gear 32 is mounted on one side of flange 30 so the teeth thereof mesh with the teeth of pinion 16. On the other side of flange 30 is mounted the enlarged portion 31 of clutch housing 34, which is also bell shaped. The small end 33 of housing 34 is mounted for rotation in housing 10 by roller bearing assembly 36 adjacent axle shaft housing 12. A plurality of threaded fasteners 38 pass through the enlarged portion of housing 34 and flange 30 and into ring gear 32, fastening these three members together to define cage 24. Enlarged portions 27 and 31 form an enlarged opening within cage 24.

A pinion shaft 40 is mounted in the enlarged portion 27 of carrier 26 normal to the rotational axis of cage 24 and for rotation therewith. Shaft 40 is locked into position in portion 27 by pins 46 and 48 at each end. Two pinion gears 42 and 44 are rotatably mounted on shaft 40 inside portion 27.

A left axle shaft 50 projects through end 33 of clutch housing 34 into the opening within portion 31. From the opposite side a right axle shaft 52 projects through end 25 of carrier 26 into the opening within portion 27. Shafts 50 and 52 have splines 54 and 56, respectively, at their ends inside the opening. A left side gear 58 is mounted on splines 54 and a right side gear 60 is mounted on splines 56. The teeth of gears 58 and 60 mesh with the teeth of gears 42 and 44 in the manner well known in differential gear structures.

The outer surface of gear 58 is splined for the non-rotatable mounting theron of a plurality of disc-shaped clutch plates 62. Interspersed with plates 62 are a plurality of clutch plates 64 splined to the inner surface of housing 34.

A bell-shaped clutch actuating member 66 is mounted within housing 34 and partially encloses gear 58 within its enlarged end. The enlarged end of member 66 terminates adjacent the clutch pack defined by clutch plates 62 and 64 and has a clutch bearing pressure member 65 thereon. A plurality of pins 68 parallel to shaft 50 slidably engage member 66 and housing 34. The narrow end of member 66 projects beyond the end 33 of housing 34, and a thrust bearing 67 is mounted on the narrow end concentric with shaft 50.

A reversible electric motor 70 is mounted on axle shaft housing 12. Motor 70 rotates a power transmission screw 72 that is rotatably mounted against a thrust washer 76 located in a bore 74 in housing 10. A nut 78 is threadably mounted for lateral movement on the screw threads of screw 72.

Nut 78 has a pivot pin 80 projecting from at least one side thereof. Pin 80 slides in a groove 82 formed in the forked end of a clutch actuating lever 84. Lever 84 projects through a slot 86 in axle housing 12 and is pivotally mounted within housing 12 on a pin 88 that is rigidly attached to housing 12. Lever 84 projects beyond pin 88 where it forms a cam portion 90. Cam portion 90 engages thrust bearing 67 of actuating member 66.

Figure 2:
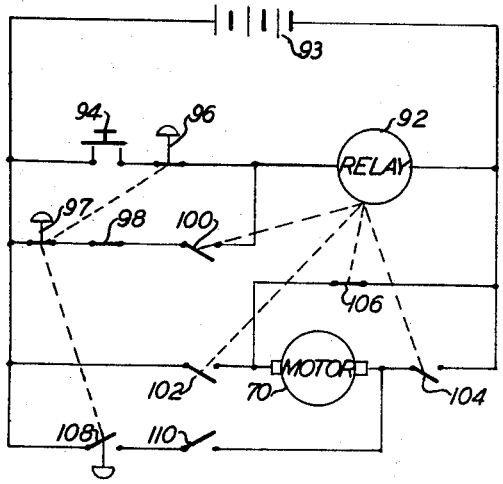
FIGURE 2 is a control circuit showing switch positions when the clutch is fully disengaged and the vehicle speed is below the preselected value at which disengaging operation is automatically initiated.

Turning to FIGURE 2, the motor control circuit comprises a relay 92 connected in series with a push-button switch 94 and a speed sensitive switch 96. In parallel with switches 94 and 96 and in series with each other are a second speed sensitive switch 97, a limit switch 98 and a switch 100 actuated by relay 92. Switch 100 is open when relay 92 is inactive. Battery 93 provides electric power for the control circuit.

Motor 70 is connected in parallel with relay 92 and switches 94 to 100. Switches 102 and 104, also actuated by relay 92, are in series with and on opposite sides of motor 70. Both switches 102 and 104 are open when relay 92 is inactive. In parallel with motor 70 and switch 104 is a switch 106 that is closed unless actuated by relay 92. In parallel with motor 70 and switch 102 and in series with each other are a third speed sensitive switch 108 and a limit switch 110.

Limit switches 98 and 110 are mounted on housings 12 and 10, respectively, adjacent level 84 (see FIGURE 1). Switch 98 is normally closed but opens when contacted by lever 84 after lever 84 has completed movement engaging clutch plates 62 and 64. Switch 110 is also normally closed but opens when contacted by lever 84 after lever 84 has completed clutch disengaging movement.

Speed sensitive switches 96, 97 and 108 are ganged for simultaneous operation and are associated with a non-driven wheel, e.g., the front wheel of a rear wheel drive vehicle. Switches 96 and 97 are closed and switch 108 is open at vehicle speeds below a preselected value, usually about 25 m.p.h. At speeds above the preselected value, switches 96 and 97 are open and switch 108 is closed.

Figure 6:
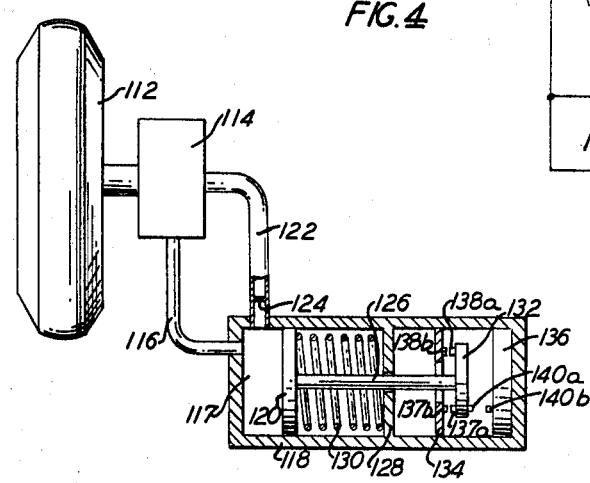
FIGURE 6 shows a speed sensitive switch assembly.

FIGURE 6 shows a hydraulic system for operating speed sensitive switches 96, 97 and 108. In the hydraulic system, a vehicle wheel 112 drives a small hydraulic pump 114. Wheel 112 is preferably an undriven wheel of the vehicle. An output hose 116 connects pump 114 with the pressure chamber 117 of a cylinder 118. Cylinder 118 has a piston 120 slidably mounted therein. A return line 122 having a flow restriction 124 therein leads from chamber 117 to the intake of pump 114.

A rod 126 is connected to the side of piston 120 opposite chamber 117. On the same side of piston 120, housing 118 has an apertured partition 128 through which rod 126 projects. A spring 130 urges piston 120 toward the left end of cylinder 118. Pump 114, piston 120, orifice 124, and spring 130 are selected so the pressure produced in chamber 117 overcomes the force of spring 130 when wheel 112 reaches the speed at which clutch disengaging operation of motor 70 is desired.

Rod 126 is attached to a disc 132 that is made of an electrically insulating material. An annular disc 134 is fixed within housing 118 between disc 132 and partition 128. On the other side of disc 132 is another disc 136 mounted in the end of housing 118. Both discs 134 and 136 are also insulating material.

Two electrical contacts 137a and 138a are mounted on the side of disc 132 that faces disc 134, and corresponding contacts 137b and 138b are mounted on disc 134. In a similar manner, an electrical contact 140a is mounted on the side of disc 132 that faces disc 136, and a corresponding contact 140b is mounted on disc 136.

Contacts 137a and b constitute switch 96, contacts 138a and b constitute switch 97, and contacts 140a and b constitute switch 108. The contacts are wired accordingly into the circuit shown in FIGURES 2–5 (lead lines have been removed from FIGURE 6 for clarity).

OPERATION

In ordinary differential gear operation, pinion 16 drives ring gear 32, carrier 26 and housing 34. Carrier 26 and housing 34 make up differential cage 24. Shaft 40 and pinion gears 42 and 44 rotate with cage 24. Nut 78 is at the end of screw 72 nearest housing 10 and clutch plates 62 and 64 are disengaged permitting relative motion between housing 34 and gear 58.

Where differential action is not required by operating conditions, pinion gears 42 and 44 do not rotate on shaft 40 but transmit torque equally to gears 58 and 60. Cage 24, pinion gears 42 and 44, and side gears 58 and 60 then rotate as a unit.

When the loads on the side gears become unequal, differential action occurs by permitting rotation of gears 42 and 44 on shaft 40, thereby driving gears 58 and 60 at different speeds. Note that gears 58 and 60 then also rotate relative to cage 24.

To prevent differential action, i.e., to lock up the unit, motor 70 is operated to turn power transmission screw in a clockwise direction (viewed from motor 70 in FIGURE 1) thereby moving nut 78 toward motor 70. Lever 84 pivots about pin 88 and cam portion 90 moves bearing 67 and member 66 to the right. Member 66 compresses plates 62 and 64, thereby preventing relative motion between gear 58 and housing 34 at torque values below those inducing plate slippage. This also prevents relative motion between gear 60 and carrier 26, so cage 24, pinion gears 42 and 44 and side gears 58 and 60 are forced to turn as a unit, thereby providing locking action.

Turning to the control circuit operation, FIGURE 2 shows the control circuit with the clutch fully disengaged, the motor inoperative, and vehicle speed below the value opening switches 96 and 97 and closing switch 108. When the vehicle driver desires to lock the differential he depresses momentarily switch 94. Electric power passes through switches 94 and 96 to actuate relay 92. Relay 92 closes switches 100, 102 and 104 and opens switch 106 (see FIGURE 3). Electric power passing through switches 97, 98 and 100 hold relay 92 closed so the driver can release switch 94.

Electric power is applied to motor 70 through switches 102 and 104, thereby starting motor 70. Motor 70 turns screw 72 clockwise to move nut 78 away from housing 10 (see FIGURE 1). Initial movement of lever 84 permits switch 110 to close.

Figure 3:
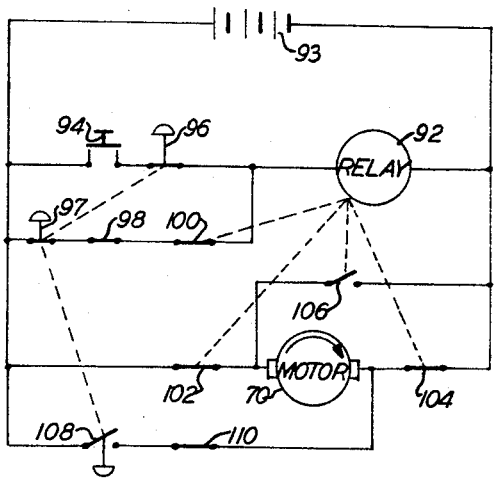
FIGURE 3 shows the control circuit switch positions when the motor is operating to engage the clutch.
Figure 4:
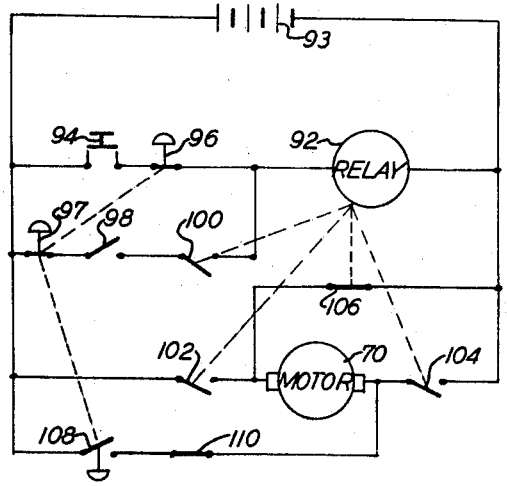
FIGURE 4 shows the switch positions when the motor is stopped with the clutch fully engaged.

Referring to FIGURES 3 and 4, when clutch pack 65 is fully engaged, lever 84 contacts switch 98 to open the latter. Opening switch 98 cuts off the electric power applied to relay 92, thereby deactivating relay 92 which opens switches 102 and 104 to stop operation of motor 70. Switch 100 is opened also and switch 106 is closed by relay deactivation.

Figure 5:
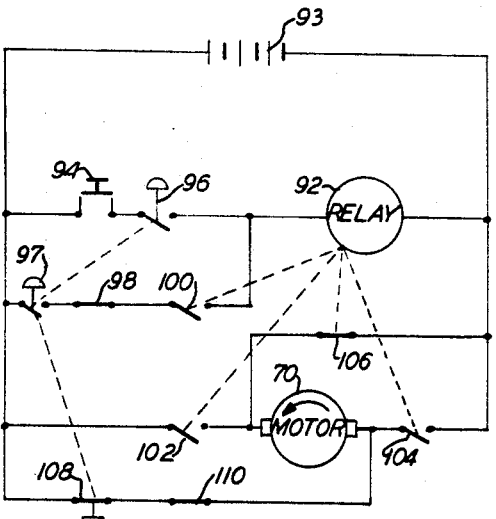
FIGURE 5 shows the switch positions when the vehicle is exceeding a preselected speed and the motor is operating to disengage the clutch.

When the speed of wheel 112 exceeds the preselected value, piston 120 and rod 126 move disc 132 to break the connection between contacts 137a and 137b and 138a and 138b and make the connection between contacts 140a and 140b. Switches 96 and 97 are thereby opened and switch 108 is closed. The control circuit then appears as shown schematically in FIGURE 5 to operate motor 70 in a counterclockwise direction to decompress clutch plates 62 and 64. In FIGURE 5, electric power is applied to motor 70 through switches 108 and 110 and the circuit is completed through switch 106.

During counterclockwise operation of motor 70 and at speeds above the preselected value, switch 96 prevents manual actuation of relay 92 which would shunt the electrical control circuit around motor 70. In case vehicle speed passes through the preselected value while motor 70 is compressing plates 62 and 64, switch 97 opens the relay circuit to prevent a similar shunt lever 84 contacts limit switch 110 to open the latter when clutch pack 65 is fully decompressed, thereby stopping motor 70.

As vehicle speed drops below the preselected value, spring 130 overcomes the decreased pressure in chamber 117, restoring switches 96, 97 and 108 to the positions shown schematically in FIGURE 2. Momentarily depressing switch 94 then begins motor operation to lock the differential gear as described above.

If desired, switches 96, 97 and 108 can be arranged for manual operation in a conventional manner, thereby providing manual control of the motor operation unlocking the differential gear assembly. Alternatively, electrical or mechanical speed sensitive switches can be used in place of the hydraulic system shown in FIGURE 6. The position of limit switch 98 on housing 12 also can be adjusted to vary the compressive pressure on plates 62 and 64, thereby varying the value of maximum torque above which clutch slippage occurs to permit differential action.

Thus, using an electric motor to lock unlock a differential gear as provided by this invention permits a more gentle actuation of the locking force, the use of manual controls for actuating the locking feature only when it is believed necessary, the use of means for unlocking the gear automatically when a certain vehicle speed is reached, and the use of means for varying the maximum torque that can be locked through the gear.

It is emphasized that the invention is not limited to the exact constructions shown or described but that changes and modifications can be made without departing from the spirit and scope of the invention as defined in the claims.

What is claimed is:

1. A differential gear assembly for a vehicle comprising a driving member and a pair of driven members, a clutch adapted to engage two of said members, an electric motor for actuating said clutch, and a control circuit for said motor comprising means for operating the motor to prevent clutch actuation when vehicle speed exceeds a predetermined value.

2. The assembly of claim 1 in which the control circuit comprises a relay actuating switches that operate said motor to engage said clutch, said relay being deactivated by said means when vehicle speed exceeds said predetermined value to open the switches producing motor operation engaging the clutch and close switches producing motor operation disengaging said clutch.

3. The assembly of claim 2 comprising a differential cage rotatably mounted in a housing, a pair of pinion gears pivotally mounted in said cage for rotation therewith, said driving member operably engaging said cage, said driven members comprising a pair of side gears meshing with said pinion gears, and said clutch being adapted to engage said cage and one of said side gears at the outer periphery of said side gear.

4. The assembly of claim 3 in which the motor turns a power transmission screw that operably engages a lever, said lever engaging means for actuating the clutch.

5. The assembly of claim 4 in which a nut is threadably mounted for lateral movement on the power transmission screw, said lever being pivotally connected to said nut.

6. The assembly of claim 5 in which the lever is pivotally mounted on the housing and operably engages a thrust bearing slidably mounted on a driven member, said thrust bearing being connected with the clutch.

7. The assembly of claim 1 in which the motor turns a power transmission screw that operably engages a lever, said lever being connected with the clutch.

8. The assembly of claim 7 in which a nut is threadably mounted for lateral movement on the power transmission screw, said lever being pivotally connected to said nut.

9. The assembly of claim 1 in which the control circuit comprises a relay, normally open switches in series with each terminal of said motor, said switches being closed by actuation of said relay, a normally closed switch in parallel with the motor and one of said normally open switches, said normally closed switch being opened by actuation of said relay, a switch open at speeds less than said predetermined value but closed at greater speeds in parallel with the motor and the other of said normally open switches, and a switch closed at speeds less than said predetermined value but open at greater speeds in series with said relay, actuation of said relay operating the motor in one direction to engage said clutch and deactuation of said relay at speeds above said predetermined value operating the motor in the other direction to disengage the clutch.

References Cited

UNITED STATES PATENTS

| | | | |
|---|---|---|---|
| 1,280,535 | 10/1918 | Perko | 74—710.5 |
| 1,355,297 | 10/1920 | Woodward | 74—710.5 |
| 1,723,901 | 8/1929 | Todd | 74—710.5 |
| 1,936,626 | 11/1933 | Hodgkins | 192—99 |
| 2,234,890 | 3/1941 | Brousseau | 74—710.5 |
| 2,731,121 | 1/1956 | Wenstrom | 192—94 |
| 2,913,928 | 11/1959 | Double | 74—710.5 |
| 2,959,066 | 11/1960 | Bailey et al. | 74—89.15 X |
| 3,138,970 | 6/1964 | Costa et al. | 74—711 |
| 3,143,340 | 8/1964 | Maslonka | 74—89.15 |
| 3,191,708 | 6/1965 | Simonds et al. | 74—710.5 X |

FRED C. MATTERN, Jr., *Primary Examiner.*

ARTHUR T. McKEON, *Assistant Examiner.*